United States Patent [19]

Utamura et al.

[11] Patent Number: 5,758,502

[45] Date of Patent: Jun. 2, 1998

[54] GAS TURBINE INTAKE AIR COOLING SYSTEM AND OPERATING METHOD THEREOF

[75] Inventors: Motoaki Utamura, Hitachi; Yuichi Keimi, Tsukuba; Yukiko Kakinuma, Tokyo; Toyohiko Ishimaru, Yokohama, all of Japan

[73] Assignee: Hitachi, Ltd., Tokyo, Japan

[21] Appl. No.: 678,072

[22] Filed: Jul. 10, 1996

[30]  Foreign Application Priority Data

Jul. 12, 1995 [JP] Japan ............................ 7-175676

[51] Int. Cl.$^6$ ............................................ F02C 1/00
[52] U.S. Cl. .............................. 60/728; 60/39.02
[58] Field of Search ........................ 60/39.02, 39.04, 60/39.182, 728, 39.83

[56] References Cited

U.S. PATENT DOCUMENTS

| | | | |
|---|---|---|---|
| 5,457,951 | 10/1995 | Johnson et al. | 60/728 |
| 5,623,822 | 4/1997 | Schuetzenduebel et al. | 60/39.182 |
| 5,632,148 | 5/1997 | Bronicki et al. | 60/728 |

FOREIGN PATENT DOCUMENTS 1-142219  6/1989  Japan.

OTHER PUBLICATIONS

EPRI GS–6874 Project 2832-4 Final Report, Jun. 1990, "Evaluation of a Gas Turbine Inlet Air-Cooling System", prepared by Joseph Technology Corporation, Inc., Woodcliff Lake, New Jersey.

Primary Examiner—Charles G. Freay
Attorney, Agent, or Firm—Fay, Sharpe, Beall, Fagan, Minnich & McKee

[57]  ABSTRACT

A gas turbine intake air cooling system and a method of operating the system are provided. The system can substantially reduce the construction cost for adding the system to a combined plant and improve the reliability of its chiller cooling system by indirectly dispersing exhaust heat from a chiller through an existing plant auxiliary equipment cooling system in the combined plant. The chiller cooling circuit is constructed so that the cooling water to the chiller is extracted through extraction water pipes branched from outlet pipes of heat exchangers composing the plant auxiliary equipment cooling system, and the cooling water heated by the chiller is returned to pipes downstream of the pumps through the returning pipes. In this construction, during operating of the chiller, a back-up division is operated to supply the plant auxiliary equipment cooling water to the chiller. By doing so, the gas turbine intake air system can be operated without affecting the combined plant side.

7 Claims, 6 Drawing Sheets

PRIOR ART

GAS TURBINE INTAKE AIR COOLING SYSTEM AND OPERATING METHOD THEREOF

BACKGROUND OF THE INVENTION

The present invention relates to a cooling system for increasing output power by cooling the gas turbine intake air and, more particularly, to a construction and an operating method of a gas turbine intake air cooling system which is applied to a combined plant.

In recent years, the share of combined plants in the electricity supply is growing since a combined plant utilizing a gas turbine has a higher thermal efficiency than a conventional steam power plant. In the gas turbine, one of the main components of the combined plant, atmospheric air is sucked and compressed by a rotary compressor, fuel is burned with the compressed air, and then the compressed high temperature gas is expanded in a turbine to generate output power. The gas turbine is rotated at a constant speed and the output power is largely affected by the specific weight of atmospheric air. That is, as shown in FIG. 3, as the temperature of atmospheric air is higher, the specific weight of the atmospheric air becomes smaller and the output power of the turbine is decreased.

On the other hand, there is a seasonal factor in the electricity demand which has a peak in the summer season, that is, there is a large demand of electricity in summer season of high atmospheric temperature. This disagrees with the characteristic of the gas turbine. As the compensation measures, there are proposed methods by which the output power of a gas turbine does not decrease even when the atmospheric temperature is high. One of them is a method of cooling the gas turbine intake air, wherein the intake air is cooled to lower than the atmospheric temperature and supplied to the gas turbine in order to prevent the gas turbine from decreasing its output power in the summer season.

A technology using the cold heat of liquid natural gas is disclosed, for example, in Japanese Patent Application Laid-Open No. 1-142219. However, there are very few sites where liquid natural gas is available. Therefore, a more widely used method is, a system utilizing a chiller as described in EPRI GS-6874 (June 1990). FIG. 2 shows the construction of an example of a conventional gas turbine intake air cooling system. Referring to the figure, in a chiller 22, a low boiling temperature refrigerant is adiabatically compressed and cooled, and then the compressed and cooled refrigerant is adiabatically expanded to produce a cold coolant. The cold coolant is guided to an air cooler 24 to cool the air flowing into a compressor 2. The heat generated in the chiller 22 is dispersed into the atmosphere from a cooling tower 37. Another method of removing the heat is to pump cooling water from the sea or a river and use it to remove the heat.

A conventional gas turbine intake air cooling system as shown in FIG. 2, for example, has the following problems for the case where the gas turbine intake air cooling system is additionally installed in an existing plant. That is, in such a case, is required a large scale construction in connection to the chiller heat removal system such as the construction of an additional cooling tower, installation of a cooling water pipe when the sea or a river is used as the heat sink. This decreases the economical merit of adding the gas turbine intake air cooling system.

Further, in a case of using the sea or a river as the heat sink, special protection against corrosion for components composing the heat removing system is required because the quality of water cannot be essentially controlled.

SUMMARY OF THE INVENTION

An object of the present invention is to provide a gas turbine intake air cooling system and a method of operating the gas turbine intake air cooling system which, even for the case where additional equipment is added to the gas turbine intake air cooling system having a chiller, can substantially decrease the need for additional equipment and can improve the reliability of the chiller cooling system.

A first feature of the present invention resides in a gas turbine intake air cooling system for increasing the output power of a combined plant by cooling the intake air of a gas turbine using a chiller, having means for branching a part of the cooling water from a plant auxiliary equipment cooling system in said combined plant and returning the cooling water to the plant auxiliary equipment cooling system after being passed through the chiller.

By this feature, even for the case where additional equipment is added to the gas turbine intake air cooling system having a chiller, the need for additional equipment can be substantially reduced and the reliability of the chiller cooling system can be improved.

A second feature of the present invention is that the gas turbine intake air cooling system has a thermal energy storage disposed between the chiller and an air cooler supplying cooled intake air into the gas turbine for storing cold heat by temporarily accumulating the cold medium generated by the chiller, and a pump for pressurizing and transferring the accumulated cold medium in the thermal energy storage to the air cooler.

By this feature, it is possible that cold heat is stored by utilizing night time electricity which has a low in price rate, and the stored cold heat is supplied to the air cooler during the peak demand period of electricity during the day time. By doing so, the economical merit can be further improved.

As mentioned above, the present invention employs a method wherein cooling water in a plant auxiliary equipment cooling water system existing in a combined plant is used as a heat sink for the chiller on condition that the gas turbine intake air cooling system is additionally installed in a combined plant having a strong need for adding the gas turbine intake air cooling system. The plant auxiliary equipment cooling system in the combined plant is for removing heat generated in the plant auxiliary equipment such as the bearing portions of the rotary machines, an oil cooling system of the steam turbine, generators (joule heat generated in winding), a central control processing unit, and is generally composed of a heat exchanger, a pump and piping. Water quality of the plant auxiliary equipment cooling water is highly controlled because of securing the long-term reliability of the components, and back-up components are provided in order to cope with a failure of the heat exchanger or the pump.

The heat generated in the bearing portions, for instance, is finally dispersed to the sea or a river through the heat exchanger.

Further, since the components of the plant auxiliary equipment cooling system are arranged inside an existing building of the plant or in an outdoor area near the building, the length of the pipes required for connecting with the chiller is substantially shorter than, and the construction work is easier than, in the conventional system in which cooling water is taken from the sea or a river.

DETAILED DESCRIPTION OF THE PREFERRED EMBODIMENTS

Embodiments of the present invention will be described in detail below, referring to the accompanying drawings.

Figure 1:
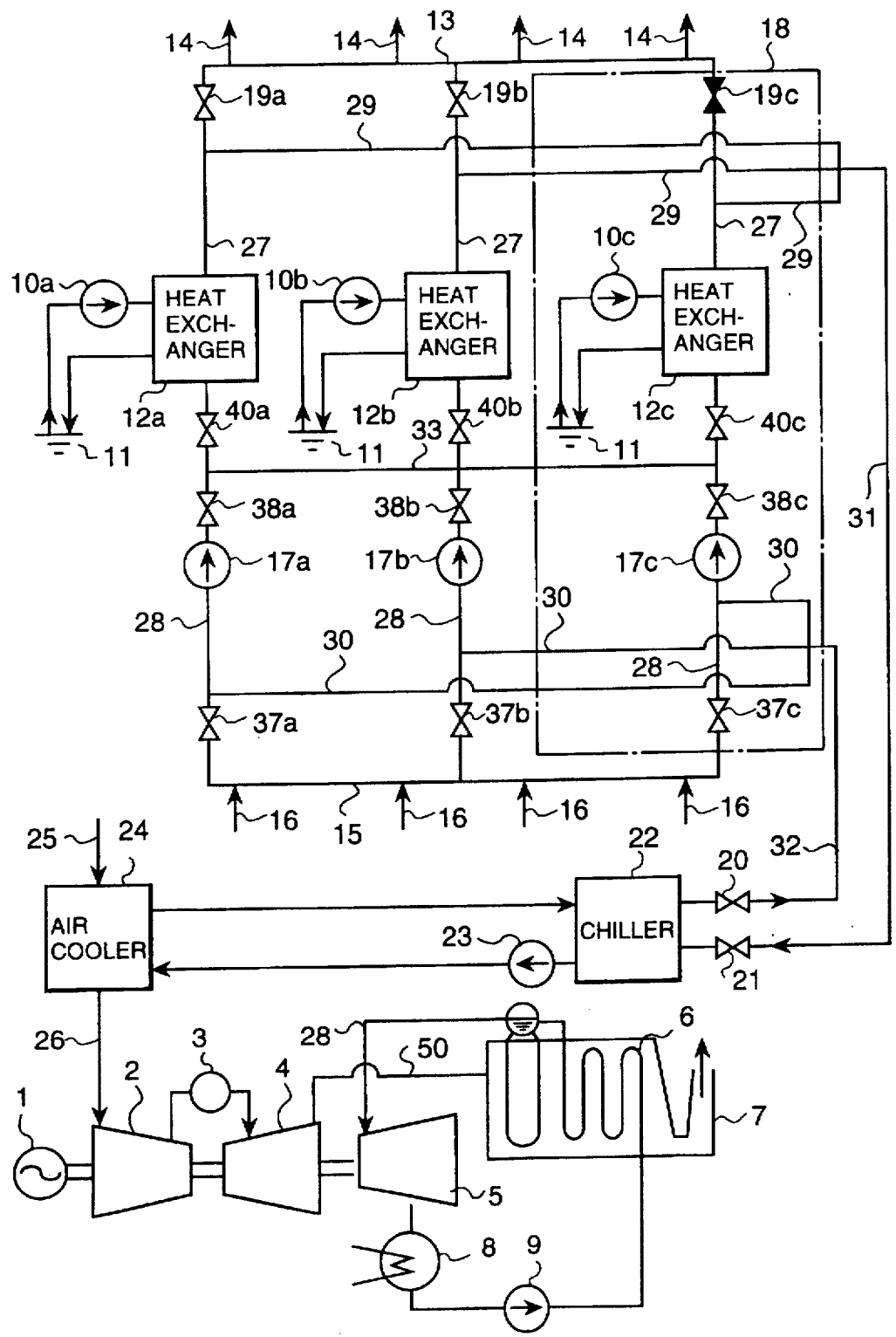
FIG. 1 is a diagram showing the construction of an embodiment of a gas turbine intake air cooling system in accordance with the present invention.
Figure 2:
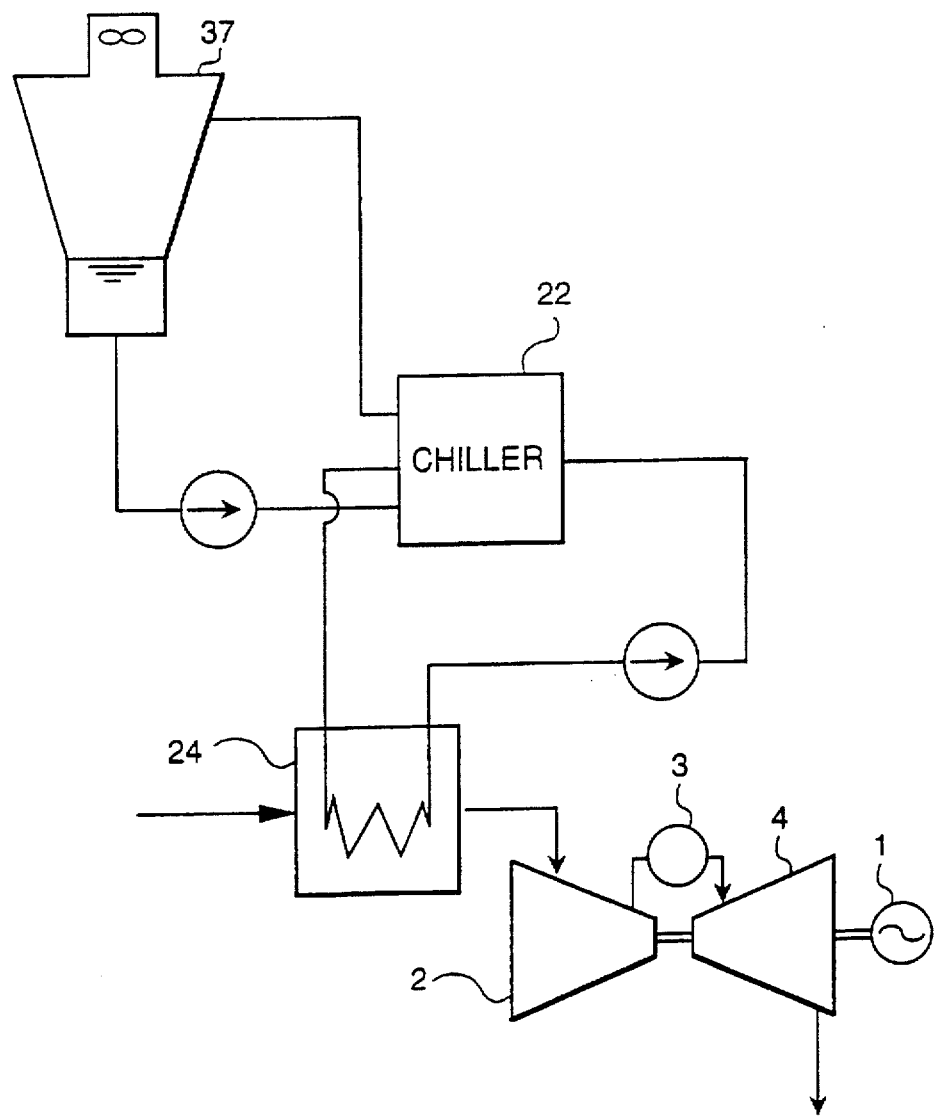
FIG. 2 is a diagram showing the construction of an example of a comparative gas turbine intake air cooling system.
Figure 3:
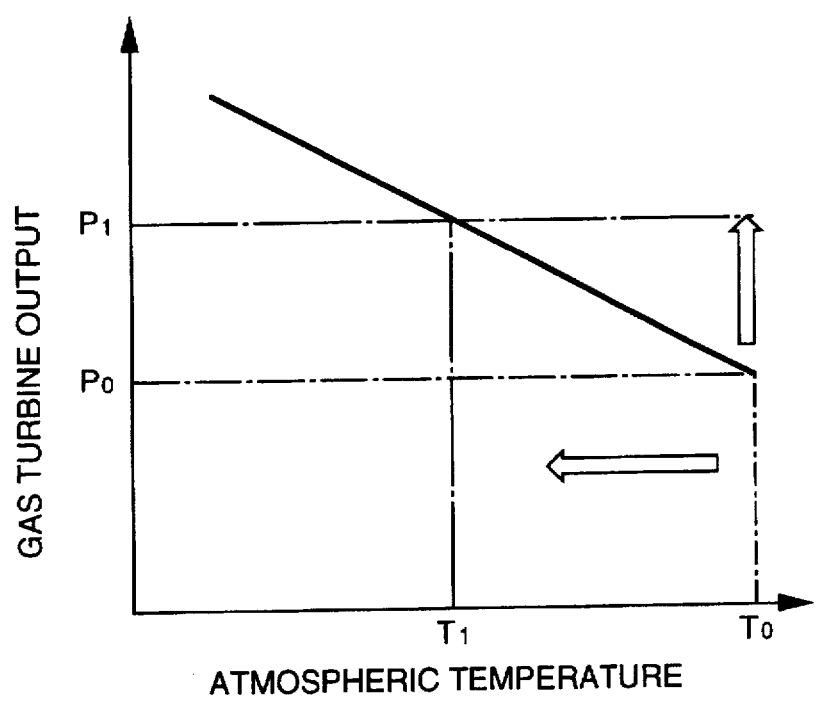
FIG. 3 is a characteristic graph showing the relationship between atmospheric temperature and gas turbine output power.

FIG. 1 shows the construction of an embodiment of a gas turbine intake air cooling system in accordance with the present invention. Referring to the figure, a combined plant, to which the present invention is to be applied, comprises a compressor 2, a combustor 3, a gas turbine 4 and a steam turbine 5. The gas turbine 4 and the steam turbine 5 are arranged on the same axis together with an electric generator 1. However, the gas turbine 4 and the steam turbine 5 may be separated from each other and arranged on different axes. The intake air 26 of the compressor 2 is heated in the combustor 3 and works in the gas turbine 4.

The exhaust gas 50 from the gas turbine 4 generates steam 28 in a boiler 6. The steam 28 works in the steam turbine 6, and then is cooled in a condenser 8. The condensed water is again pumped to the boiler 6 using a feed water pump 9. The exhaust gas 50 is exhausted from a exhaust section 7 through the boiler 6.

As described above, the combined plant generates electricity by a combination of the gas turbine 4 and steam turbine 5, and a power station generally has a plurality of sets of combinations (hereinafter, the combination is referred to a "shaft"). In the plant auxiliary equipment cooling system for cooling heat generating portions of the plant such as the bearings of rotary machines composing the plant, a flow circuit is constructed by arranging combinations of the shaft cooling water pumps 17a, 17b, 17c and the heat exchangers 12a, 12b, 12c in parallel and connecting the combinations by headers 13, 15, 33. This figure shows the gas turbine intake air cooling system with three cooling water systems arranged in parallel, however, the number of systems to be arranged in parallel is not limited to three and any other suitable number of systems can be used.

Cooling water is supplied to the heat exchangers 12a, 12b, 12c from a water source 11 by recirculation pumps 10a, 10b, 10c. Plant auxiliary equipment cooling water flowing out of the heat exchangers 12a, 12b, 12c is supplied to the components in each of the shafts by means of the header 13 through communicating pipes 14, and returned to the header 15 through communicating pipes 16 after exchanging heat in the components in the shafts.

The cooling water returned to the header 15 is sent to the shaft cooling water pumps 17a, 17b, 17c through valves 37a, 37b, 37c opened at a predetermined opening to the flow and supply it to the heat exchangers 12a, 12b, 12c again.

In general, in the plant auxiliary equipment cooling system having three cooling water systems (a), (b) and (c), one (c) of the three systems is composed of the recirculation pump 10c, the heat exchanger 12c and the shaft cooling water pump 17c, as described above. Accordingly, system (c) stands by as a back-up division 18, and when an abnormality occurs in the other two systems (a) and (b), the back-up division 18 is started to supply cooling water to the components in the shafts, whereby the reliability of the plant auxiliary equipment cooling system is improved.

In the present embodiment, the chiller 22 of the gas turbine intake air cooling system is connected to a part of the plant auxiliary equipment cooling system by piping 31, 29; 32, 30.

The aforementioned bearing cooling system and the gas turbine intake air cooling system are connected as follows. That is, extraction water pipes 29, which are connected to heat exchanger outlet pipes 27 of respective cooling water systems, respectively, each are connected to a pipe 31 which is connected to the chiller 22 through a valve 21.

As the chiller 22, a refrigerator for example can be used. Further, a turbo refrigerator, an absorption type refrigerator or other cooling water generator can be used.

A pipe 32 led from the chiller 22 is branched at the downstream side of a valve 20 into returning pipes 30 which are connected to suction pipes 28 of the shaft cooling water pumps 17a, 17b, 17c.

Cold coolant flowing from the chiller 22 is recirculated in a closed loop formed so that the cold coolant is transferred to an air cooler 24 through a pump 23, and returned to the chiller 22 again after exchanging heat with atmospheric air 25. The atmospheric air 25 is cooled in the air cooler 24 and the cooled air is supplied to the compressor 2, whereby the gas turbine output can be increased.

During the operation of the chiller 22, waste heat is removed from the chiller 22 by operating a back-up division of the heat exchanger and the pump of the existing plant auxiliary equipment cooling system and that supplies a part of bearing cooling water.

In the above first embodiment, in addition to the above construction, the water extraction pipes 29 for supplying cooling water to the chiller 22 are connected to each heat exchanger outlet pipe 27 which is at a delivery side of the shaft cooling water pump 17a, 17b, 17c of the plant auxiliary equipment cooling system and at an outlet side of the heat exchanger 12a, 12b, 12c. Further, the returning pipes 30 from the chiller 22 are disposed at a suction side of the shaft cooling water pump 17a, 17b, 17c of each cooling water system and are connected to a suction pipe 28 of inlet side of the heat exchanger 12a, 12b, 12c.

An operation method of the gas turbine intake air cooling system in the present embodiment will be described below. In the case wherein the cooling water system (a) having the shaft cooling water pump 17a and the heat exchanger 12a and the cooling water system (b) having the shaft cooling water pump 17b and the heat exchanger 12b of the above-mentioned cooling water systems (a), (b) and (c) are operated as the plant auxiliary equipment cooling system, initially, the valves 20, 21 are opened and the valve 19c in the back-up division 18 is closed, and then the recirculation water pump 10c and the shaft cooling water pump 17c of the back-up division 18 are started to be driven, whereby plant auxiliary equipment cooling water having its heat exchanged in the heat exchanger 12c is supplied to the chiller 22 through the heat exchanger outlet pipe 27, the water extraction pipe 29, the pipe 31 and the valve 21. The cooling water left leaving the chiller 22 is returned to the plant auxiliary equipment cooling water system through the valve 20 and the pipes 32, 30 and supplied to the heat exchanger 12c through the shaft cooling water pump 17c.

While plant auxiliary equipment cooling water is being sent to the chiller 22, the other plant auxiliary equipment cooling water is supplied to components of the respective cooling water systems through the valves 19a and 19b.

The cooling water from the chiller 22 is recirculated in a closed line in which the cooling water that has passed through the chiller 22 is transferred to the air cooler 24 through the pump 23, and heat-exchanged with the atmosphere 25, and then returned to the chiller 22 again. The atmosphere 25 is cooled with the air cooler 24, and as a result cooled air 26 is supplied into the compressor 2. *p Further, in such a case that the load of one of the cooling water systems is decreased by using a cooling water system serving as a back-up, a control apparatus can be provided, which controls the cooling water supplied from the heat exchanger outlet pipe 27 of the back-up division working as a back-up at that time into chiller 22 through the water extraction pipe 29 and the pipe 31 and the cooling water flowing in the heat exchanger 27 of the other cooling water systems which flows into the respective components of each shaft.

On the other hand, it is possible to branch cooling water to the chiller 22 from the heat exchanger outlet pipe 27 in which cooling water flows to the respective components of each shaft.

For example, an operation is possible without provision of new heat exchanger or without increasing equipment for the chiller 22 such as a pump, by recirculating cooling water by action of the plant auxiliary equipment cooling water system of the back-up division.

Figure 4:
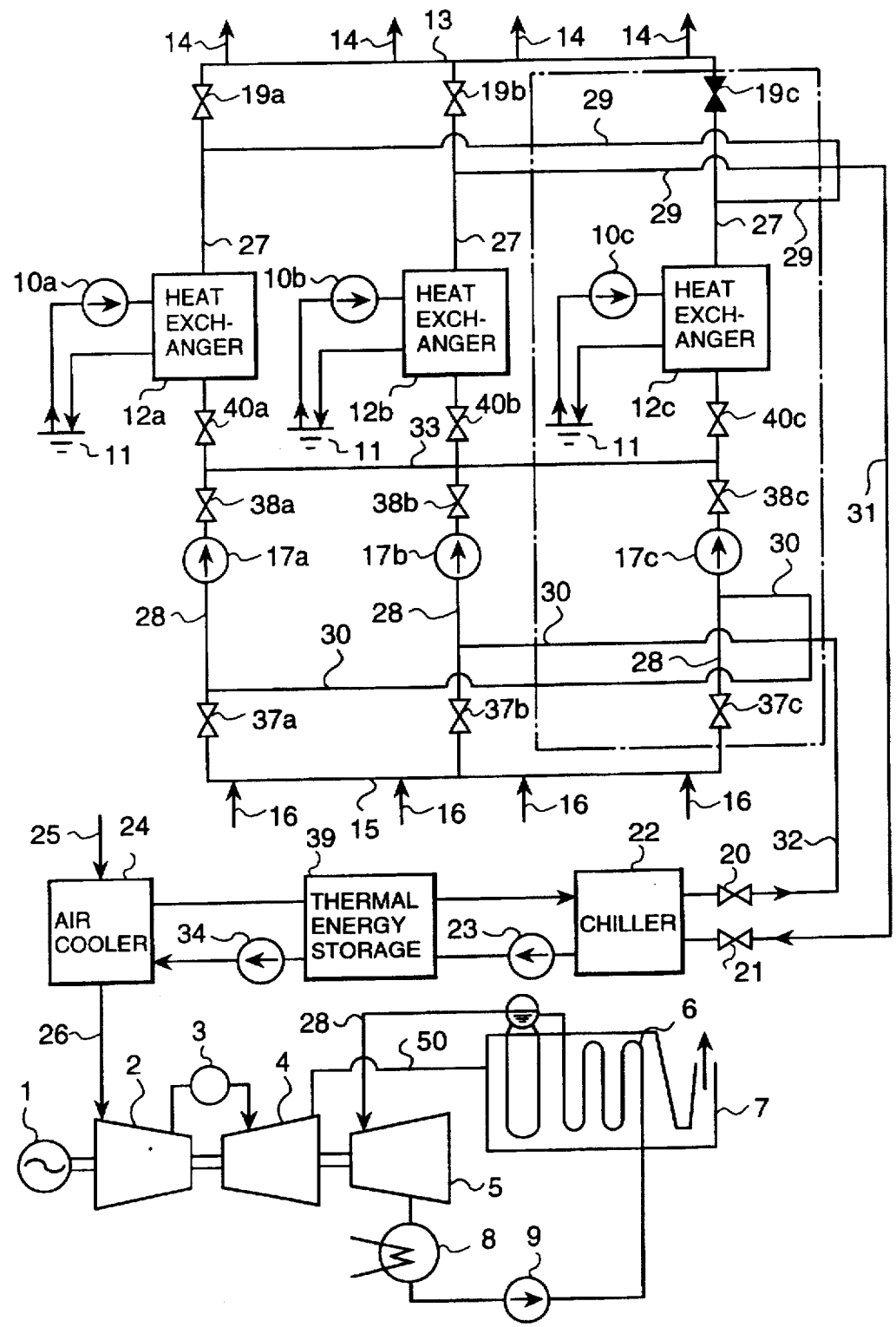
FIG. 4 is a diagram showing the construction of another embodiment of a gas turbine intake air cooling system in accordance with the present invention.

FIG. 4 shows a second embodiment of a gas turbine intake air cooling system in accordance with the present invention. This embodiment can employ principally the same construction as in the first embodiment. The present embodiment is constructed by adding a thermal energy storage 39 and a pump 34 to the first embodiment, and the chiller 22 and the air cooler 24 are connected through the thermal energy storage 39 and the pump 34.

Concretely, the present embodiment is constructed so that cooling water generated in the chiller 22 is supplied to the thermal energy storage 39 by the pump 23. The cooling water recirculates between the chiller 22 and the thermal energy storage 33. It is constructed so that cold heat stored in the thermal energy storage 39 is supplied to the air cooler 24 by the pump 34. The cooling water also recirculates between the air cooler 24 and the thermal energy storage 39.

During night time, cooling water having more cold heat more than the amount of cold heat of atmosphere 25 required at the air cooler 24 is generated in the chiller 22. Cooling water is supplied from a part of the above-mentioned plant auxiliary equipment cooling water system to the chiller 22, the cooling water generated in the chiller 22 is supplied to the thermal energy storage 39 by the pump 23 for heat-exchange, and then the cooling water is recirculated into the chiller 22 again. Cold heat other than an amount necessary to cool at the air cooler is stored in the thermal energy storage 39.

When the demand for cooling is large as in the day time, cooling water is supplied from the plant auxiliary equipment cooling water system to the chiller 22, and cold heat stored in the thermal energy storage 39 is supplied to the air the cooler 24 by the pump 34 in addition to cooling water generated in the chiller 22 to cool the atmosphere 25.

By this construction, the operating time of storing cold heat and the operating time of transferring the stored cold heat to the air cooler 24 can be separated. Since a component mainly consuming electricity in the gas turbine intake air cooling system having the chiller 22 is the compressor installed in the chiller 22, there is an effect to save the cost of operating this system by performing such an operation that the chiller is operated and the cold heat is stored by at night time when the electricity demand is low so that the stored cold heat can be the day time.

Figure 5:
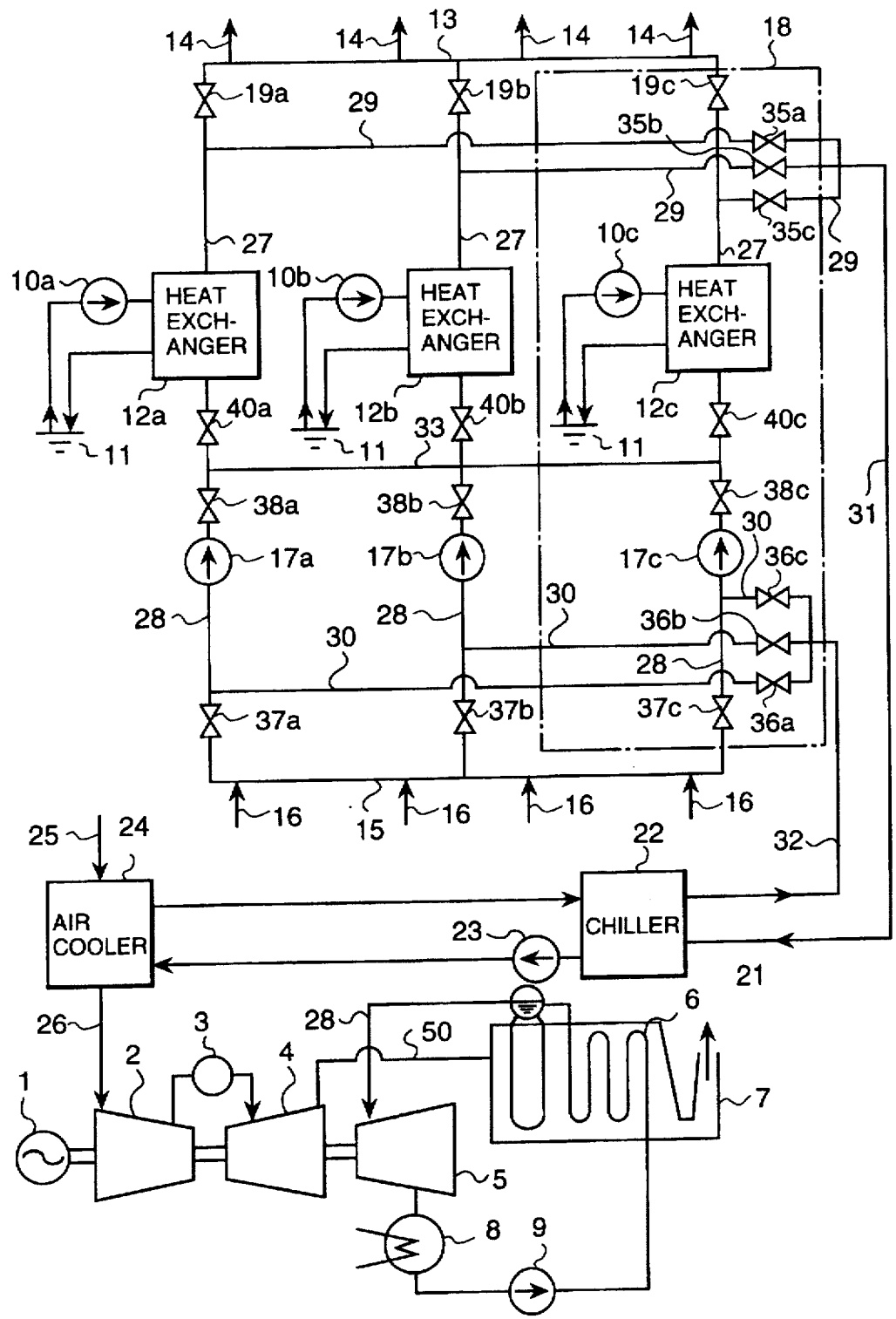
FIG. 5 is a diagram showing the construction of a further embodiment of a gas turbine intake air cooling system in accordance with the present invention.

FIG. 5 shows the construction of a third embodiment of a gas turbine intake air cooling system in accordance with the present invention. This embodiment also can employ principally the same construction as the first embodiment. The present embodiment is provided with opening adjustable control valves 35a, 35b, 35c and opening adjustable control valves 36a, 36b, 36c on the branch pipes 29, 30 instead of the valves 20, 21 in the embodiment shown in FIG. 1.

For example, while all the plant auxiliary equipment cooling water systems operate, valves 35a, 35b, 35c are controlled so that the amount of cooling water supplied from each of the heat exchanger outlet pipes 27 of the respective cooling water systems to the chiller 22 will become uniform. In the case wherein cooling water having passed through the chiller 22 is returned to the respective suction pipes 28, valves 36a, 36b, 36c are controlled so that amounts of cooling water to be returned to the respective cooling water systems are uniform. Therefore, it is possible to realize such a preferable operating state that the heat loads of the heat exchangers 12a, 12b, 12c can be made uniform.

Further, in this embodiment, even if the amount of supply water to the connection pipes 14 is constant, an intake amount of cooling water can be adjusted to take different amounts at the heat exchanger outlet pipes 27 of the respective systems, and an amount of cooling water returned to the plant auxiliary equipment cooling water system can be adjusted to take different amounts at the suction pipes 28 of the respective systems, whereby this embodiment has an advantage in that the distribution of the cooling water supplied to the communicating pipes 14 and the gas turbine intake air cooling system can be optimized corresponding to each heat load.

Furthermore, in a case where most of the shafts of the facilities are stopped during the night time or at other time and accordingly there is ample capacity in the plant auxiliary equipment cooling system, it is possible to extract water from the outlet ports of the heat exchangers in operation by closing the valve 19c and the extraction water valve 35c without starting the back-up division 18'. Therefore, there is an advantageous effect in that the electric power for the shaft cooling water pump can be saved.

Each of the aforementioned embodiments has an advantage in that work for adding piping can be performed without stopping the operation of the combined plant. That is, the valves 19c, 37c, 38c, 40c of the back-up division 18' are closed and the remaining water inside the pipe is drained, and then the extraction water pipe 29 and the returning pipe 30 are provided on the back-up division by welding. After completion of welding, the same work for the division a or b can be performed by having the back-up division c started operating and switching the system a or b to a back-up division.

Figure 6:
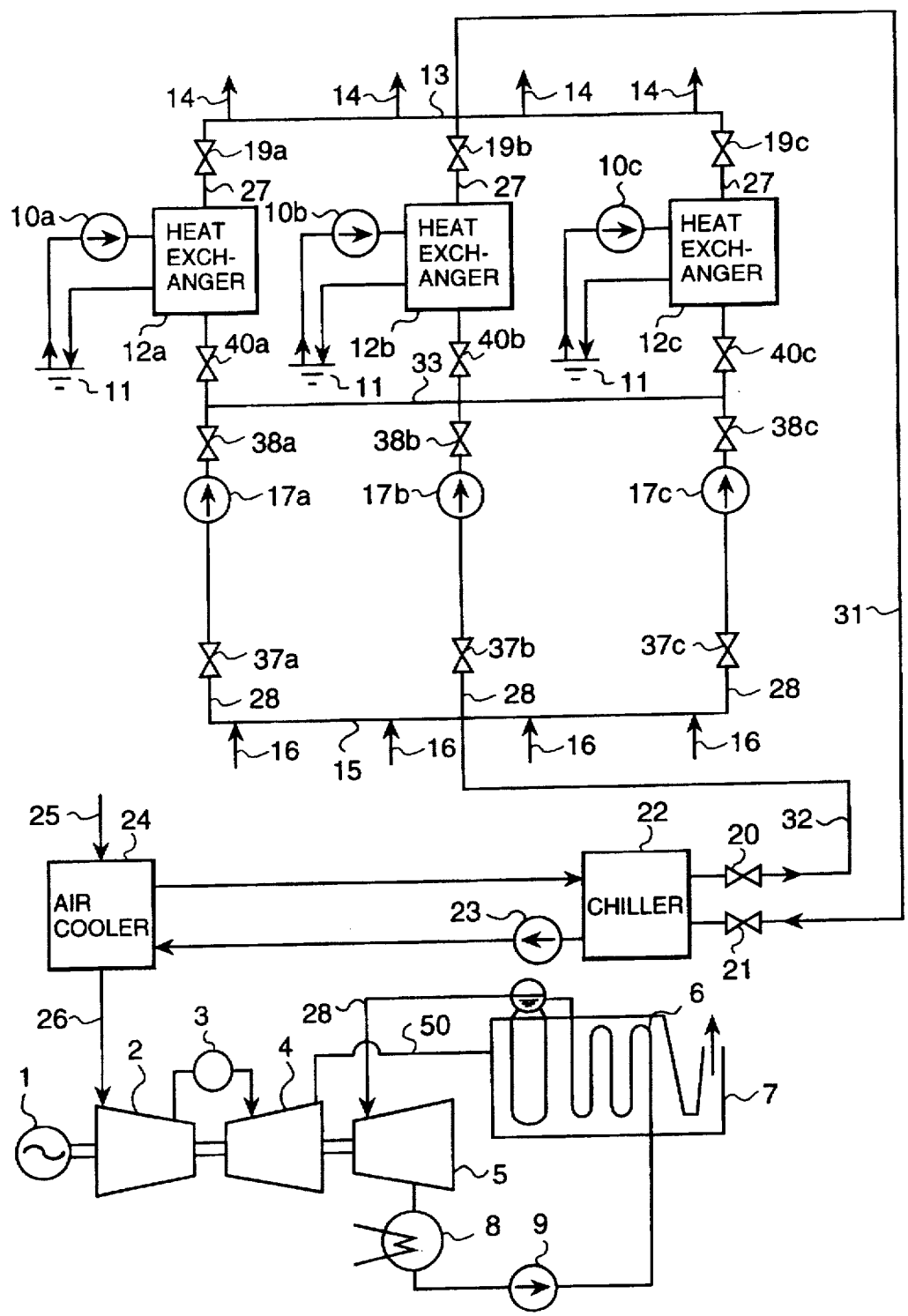
FIG. 6 is a diagram showing the construction of a still further embodiment of a gas turbine intake air cooling system in accordance with the present invention.

FIG. 6 shows the construction of a fourth embodiment of a gas turbine intake air cooling system in accordance with the present invention. This embodiment can employ principally the same construction as the first embodiment. In the three aforementioned embodiments, the pipe 31 is connected to the outlet pipes 27 of the heat exchangers 12a, 12b, 12c through the extraction water pipes 29, and the pipe 32 is connected to the pipes 28 in the downstream side of the pumps 17a, 17b, 17c through the returning pipes 30. On the other hand, in this embodiment, the pipe 31 is connected to the header 13 placed in the outlet ports of the heat exchangers 12 and the pipe 32 is connected to the header 15 placed in the downstream of the pumps 17.

By this construction, the work for adding the gas turbine intake air cooling system can be performed only when operation of the plant auxiliary equipment cooling system can be stopped, such as in the case where a new combined plant is constructed or in the case where a combined plant can be stopped in operation for a long period. However, the piping structure is simpler than that in the aforementioned three embodiments.

According to the above-mentioned embodiment, since the gas turbine intake air cooling system uses water of the existing plant auxiliary equipment cooling system as the cooling water, there are effects in that construction cost of adding the cooling system for the chiller can be substantially decreased, and corrosion of the components can be decreased because water quality of the plant auxiliary equipment cooling system is good.

What is claimed is:

1. A gas turbine intake air cooling system for increasing output power of a combined plant by cooling intake air of a gas turbine using a chiller, wherein
cooling water supply means is provided for branching a part of cooling water from a plant auxiliary equipment cooling system in said combined plant, passing it through said chiller, then returning it to said plant auxiliary equipment cooling system.

2. A gas turbine intake air cooling system according to claim 1, wherein said cooling water supply means comprises a piping system, constructed so that a first pipe is connected between the inlet water side of said chiller and each of extraction water pipes connected to each of heat exchanger outlet pipes of each of heat exchangers provided in the delivery side of a shaft cooling water pump in said plant auxiliary equipment cooling system, through a first valve, and a second pipe is connected to the outlet water side of said chiller, branched and connected to each of returning pipes connected to each of suction pipes of said each of heat exchangers provided in the downstream side of a second valve and in suction side of said shaft cooling water pump through said second valve.

3. A gas turbine intake air cooling system according to claim 1, wherein said cooling water supply means comprises a piping system, constructed so that a first pipe is connected between each of heat exchanger outlet pipes and the inlet water side of said chiller through each of extraction water pipes connected to each of heat exchanger outlet pipes of each of heat exchangers provided in the delivery side of a shaft cooling water pump in said plant auxiliary equipment cooling system through a first valve, and a second pipe is connected to the outlet water side of said chiller, branched and connected to each of returning pipes connected to each of suction pipes of said each of heat exchangers provided in the downstream side of a second valve and in suction side of said shaft cooling water pump through said second valve, a group of first control valves capable of adjusting valve opening being respectively connected to said branched extraction water pipes, a group of second control valves capable of adjusting valve opening being respectively connected to said branched returning pipes.

4. A gas turbine intake air cooling system according to claim 1, wherein said cooling water supply means comprises a piping system, constructed so that a first pipe is connected between a first header commonly connected to each of heat exchanger outlet pipes of each of heat exchangers provided in the delivery side of a shaft cooling water pump in said plant auxiliary equipment cooling water system and the inlet water side of said chiller through a first valve, and a second pipe is connected between the outlet side of said chiller and a second header commonly connected to each of suction pipes of said each of heat exchangers provided in the suction side of said shaft cooling water pump.

5. A gas turbine intake air cooling system according to claim 1, wherein when said chiller is started to be operated, a set of an existing pump and an existing heat exchanger normally in a stand-by state composing said plant auxiliary equipment cooling system is operated to supply a part of cooling water of said plant auxiliary equipment cooling system to said chiller.

6. A gas turbine intake air cooling system according to claim 1, further comprising a thermal energy storage for storing cold heat by temporarily accumulating the cold coolant produced by said chiller provided between said chiller and an air cooler for supplying cooled intake air to said gas turbine, and a pump for pumping the cold coolant stored in said thermal energy storage to said air cooler.

7. A method of operating the gas turbine intake air cooling system according to claim 6, wherein said chiller is operated during night time to store cold heat, and intake air of the gas turbine is cooled by consuming the stored cold heat during day time when need for electricity increases.

* * * * *